(12) United States Patent
Townsend

(10) Patent No.: US 7,878,748 B2
(45) Date of Patent: Feb. 1, 2011

(54) THREADED FASTENERS WITH RIBBED SHANKS

(76) Inventor: Douglas W. Townsend, 1711 Westminster Way, Annapolis, MD (US) 21401-6436

( * ) Notice: Subject to any disclaimer, the term of this patent is extended or adjusted under 35 U.S.C. 154(b) by 357 days.

(21) Appl. No.: 11/785,554

(22) Filed: Apr. 18, 2007

(65) Prior Publication Data
US 2008/0260492 A1    Oct. 23, 2008

(51) Int. Cl.
*F16B 35/00* (2006.01)
(52) U.S. Cl. .................................................. 411/424
(58) Field of Classification Search ............... 411/399, 411/424, 426, 362
See application file for complete search history.

(56) References Cited

U.S. PATENT DOCUMENTS

| | | | | |
|---|---|---|---|---|
| 440,331 | A | * | 11/1890 | Rogers ........................ 411/424 |
| 461,621 | A | | 10/1891 | Rogers |
| 1,926,925 | A | | 9/1933 | Wescott |
| 2,341,469 | A | * | 2/1944 | Newall ........................ 470/17 |
| 2,895,368 | A | | 7/1959 | Place |
| 3,418,012 | A | | 12/1968 | La Torre |
| 3,921,364 | A | * | 11/1975 | Briles ........................ 411/378 |
| 4,018,132 | A | * | 4/1977 | Abe ........................... 411/413 |
| 4,338,054 | A | | 7/1982 | Dahl |
| 4,584,247 | A | | 4/1986 | Mulholland |
| 6,264,414 | B1 | * | 7/2001 | Hartmann et al. ........... 411/411 |
| 6,503,038 | B2 | * | 1/2003 | McGough ................... 411/424 |

* cited by examiner

*Primary Examiner*—Flemming Saether
(74) *Attorney, Agent, or Firm*—Millen, White, Zelano & Branigan, P.C.

(57) ABSTRACT

A metal bolt or cap screw fastener has a head, a shank of reduced cross section and a threaded portion, which fastener is configured to be manufactured using cold forming automatic bolt making machines of concurrent configuration. The reduced cross section shank provides additional elastic stretch and reduces stress throughout the fastener upon application of external joint parting loads, as compared to conventional fasteners with nominal diameter shanks. The inventive fastener has at least three straight longitudinal ribs along the length of the reduced cross section shank. The longitudinal ribs extend laterally outward from the surface of the shank a distance substantially corresponding to the fastener nominal diameter so as to center the fastener within round holes. During cold forming, the fastener shank diameter is made to the same or somewhat larger diameter than the not yet threaded part of the bolt.

9 Claims, 6 Drawing Sheets

THREADED FASTENERS WITH RIBBED SHANKS

FIELD OF THE INVENTION

The present invention relates to threaded fasteners with ribbed self-centering shanks, wherein the threaded fasteners are configured as bolts and cap screws with reduced cross section shanks.

BACKGROUND OF THE INVENTION

Fasteners in the form of bolts and cap screws are usually produced using automatic bolt making cold forming machines. In these machines, wire is typically fed into the machines with the wire being of the diameter larger than the shank diameter of the bolt being made. This usually involves drawing the wire through a die which reduces its diameter to within about one hundredth of an inch larger than the final shank diameter. The rod is cut to length to form a slug which is then formed into a bolt blank prior to threading. The bolt blank has a first portion which that is upset at the end of the rod to form a head, a second unthreaded shank portion and a reduced diameter third portion that is subsequently formed into a thread. The third portion of the bolt blank is typically forward extruded into the cavity die in the bolt making machine to produce a diameter close to that of the pitch diameter of the subsequently formed thread. The blank is then ejected from or kicked out of the bolt making machine. Thereafter, a thread is usually formed on the third portion of the bolt blank in a thread rolling machine in which dies deform the blank to form the helix thereon having a thread crest diameter slightly less than the nominal diameter of the bolt. In order for the bolt to center in a cylindrical bolt hole in an element to be assembled by the bolt, it is necessary that the shank portion of the bolt have a diameter only slightly smaller than the diameter of the cylindrical bolt hole.

There are advantages to reconfiguring the shank portion of the bolt, which advantages are nullified if a bolt manufacturer must substantially redesign very expensive bolt making machines or reduce the cross sectional area of the bolt shank by subsequent manufacturing steps. To date the advantage of reducing the cross section of the shank portion has not been commercially exploited by reducing the shank cross sectional area of bolt blanks produced in cold forming bolt making machines. Prior art reduced area shank bolts are of designs which could not be made in their final form in conventional bolt making machines because their blanks could not be ejected from single piece cavity dies. The shape of prior art reduced area bolt shanks would interfere with ejecting the bolt blanks from single piece bolt blank cavity dies. Consequently, the advantages of such bolt designs are not generally available except as special purpose bolts which are relatively expensive and are usually custom manufactured for specific machines and assemblies.

Among the advantages of reducing the diameter of the shank portion are savings in steel consumption. Due to rapidly growth and manufacturing throughout the world, steel and other metals are becoming increasingly expensive. Use of the present invention results in about 10-15% reduction in the quantity of metal needed to produce clamping bolts for specified uses and results in material savings and price stabilization not only for bolt manufacturers but for their customers. By reducing the amount of metal required to manufacture bolts, weight reduction can be achieved in vehicles which use bolts, such as but not limited to, engines and airframes for aircraft and similarly for automotive vehicles which result in substantial fuel savings. For example, there is a cost of about five-hundred dollars per year for an airline to fly each pound of weight. A reduction in the weight of each of the many steel bolts used in aircraft structures, such as landing gear, airframes and engines, therefore results in substantial savings to air carriers.

The mechanical advantages of having shank portions with reduced cross section include providing additional elastic stretch and reduced stress throughout threaded fasteners upon application of external joint parting loads, as compared to conventional fasteners with shanks of nominal diameter. These advantages become available with fasteners such as bolts and cap screws which can be configured so as to be ejected from conventional bolt making machines.

Prior art patents describe ways to manufacture reduced area shank threaded fasteners by employing additional manufacturing steps to reduce the shank cross sectional areas of fasteners manufactured with conventional nominal bolt diameter round shanks. Prior art patents typically show reduced cross sectional area fasteners produced by reducing the shank diameter below the equivalent diameter of the thread stress area or by forming windows in the shanks or by reduced diameter sections. These prior art fasteners with reduced area shank cross sections cannot be manufactured in conventional automatic bolt makers because they cannot be ejected from cavity dies due to recessed windows or round cross sections in the shank with closed ends.

SUMMARY OF THE INVENTION

Cap screws are configured to pass through a bolt hole in a first element and thread with a threaded bore in a second element. Bolts are configured to clamp two or more elements together and thread with a nut. The fastener comprises a rod having a longitudinal axis, a first end and a second end as well as a head at the first end of the rod for abutting a surface adjacent the bolt hole. The rod further includes a threaded portion extending axially from the second end of the rod toward the head, the threaded portion having a thread crest slightly less than the nominal diameter D, of the bolt and defining a thread stress area. An unthreaded shank portion of the rod is disposed between the threaded portion and the head of the rod, the unthreaded shank portion having a diameter $D_1$, wherein $D_1$ is less than D. The diameter $D_1$ of the shank portion can alternately be slightly greater at the head portion and slightly tapered with a decreasing diameter from the fastener head to the threaded portion. At least three longitudinal extending, straight ribs on the unthreaded shank portion, the ribs each having a radius greater than $D_1$ divided by 2 to laterally stabilize the bolt in the bolt hole, whereby the unthreaded shank portion of diameter $D_1$ provides additional elastic stretch and reduced stress throughout the fastener upon application of external joint parting loads.

In a further aspect of the fastener, the threaded portion of the rod is raised from the material of the rod with the threads being formed of the same material as the rod.

In a further aspect of the fasterier, the unthreaded shank portion has a constant or slightly decreasing diameter.

In still a further aspect of the fastener, the unthreaded shank portion has a cross sectional area that is greater than the thread stress area by the cross section of the three ribs.

In still a further aspect of the fastener, the fastener is made of steel or other metal.

A fastener is made from a bolt blank that can be longitudinally ejected or kicked out of a one piece cavity die in a bolt making machine. The fastener is receivable in a cylindrical hole of a first element and threadable in a threaded bore of a second element. The bolt blank comprises a rod having a longitudinal axis, a first end portion and a second end portion, wherein the first end portion is upsettable to form a head and the second end portion is deformable into a helical thread. The rod has a shank portion between the first and second end portions, which shank portion remains unthreaded. At least three longitudinally extending, straight ribs are located only on the shank portion of the rod for centering the fastener made from the blank in the cylindrical hole of the element to be fastened. The shank portion between the ribs has a diameter substantially less than that of the nominal diameter to provide additional elastic stretch and reduced elastic stress in the fastener made from the blank wherein the blank is configured for ejection or kicking out from the metal forming die arrangement in the bolt forming machine.

The fastener configured from the blank is either a steel or other metal threaded bolt or a steel or other metal cap screw.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1:
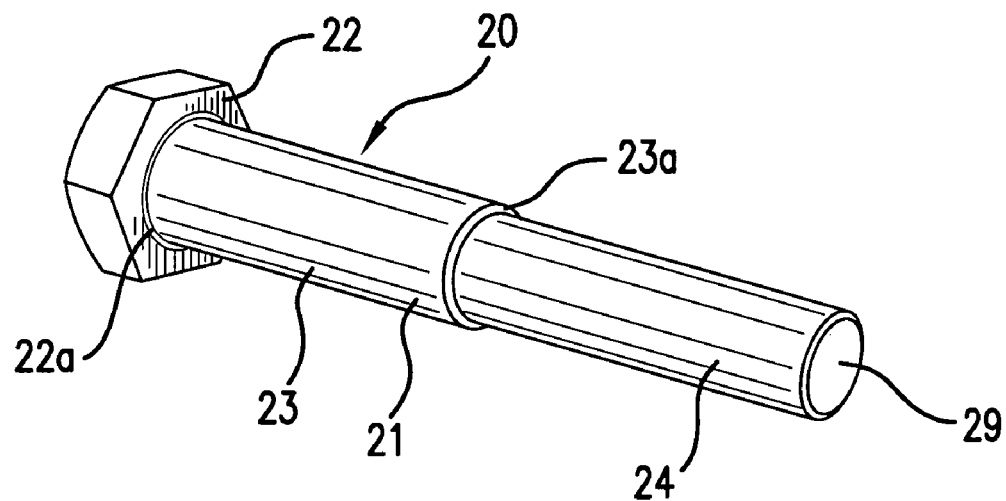
FIG. 1 is a perspective view of a bolt blank for configuring a fastener in accordance with prior art practices.

Referring now to FIG. 1, there is shown a bolt blank 20 made of steel or other metal formed by a bolt making machine wherein the blank comprises a rod 21 which is unitary with a head 22. In order to avoid stress fractures, the junction of the rod 21 and head 22 is formed with a fillet 22a. The rod 21 has a first shank portion 23 that is unthreaded and a second portion 24 that is unthreaded, but is subsequently deformed to form threads by a machine, such as a thread rolling machine, that upsets the metal of the second portion to form a helical thread.

Figure 2:
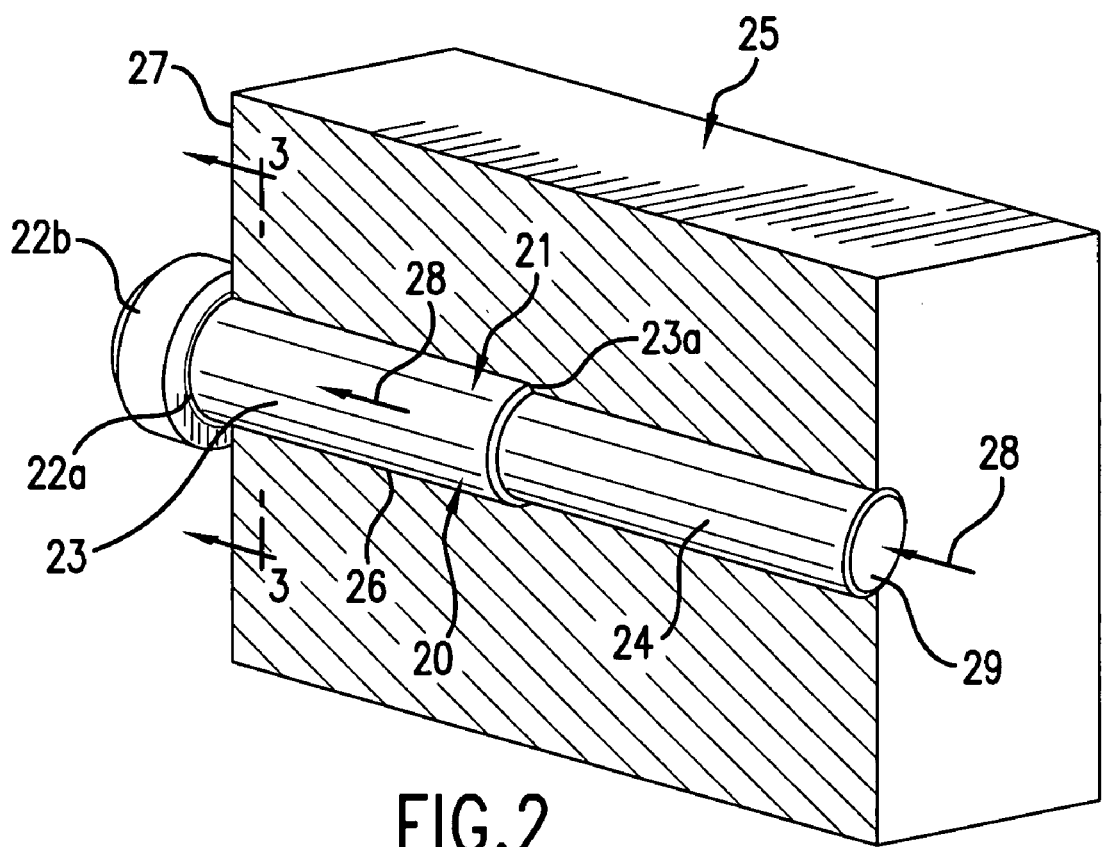
FIG. 2 is a perspective view of the blank of FIG. 1 seated in a cavity die just prior to ejectment from a bolt making machine.
Figure 3:
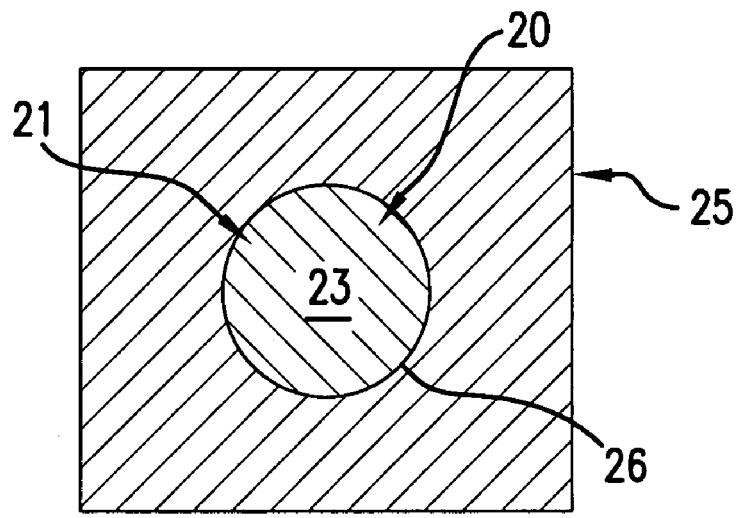
FIG. 3 is an elevation taken along lines 3-3 of FIG. 2.

As is seen in FIGS. 2 and 3, the bolt blank 20 is positioned in a unitary cavity die 25 that has a cylindrical die face 26 for forming the first and second portions 23 and 24 of the rod 21 and a front face 27 against which the unfinished head 22b of the blank abuts. The head 22b of the blank 20 is typically circular in FIG. 2 and is finished by shearing to create four or six sides as in FIG. 1. The cavity die is also configured to produce a fillet 23a between portions 22 and 23 of the bolt blank 20. After the bolt blank 20 is formed, it is ejected in the direction of arrow 28 out of the die 25 by a force applied to the end surface 29 of the bolt blank.

Figure 4:
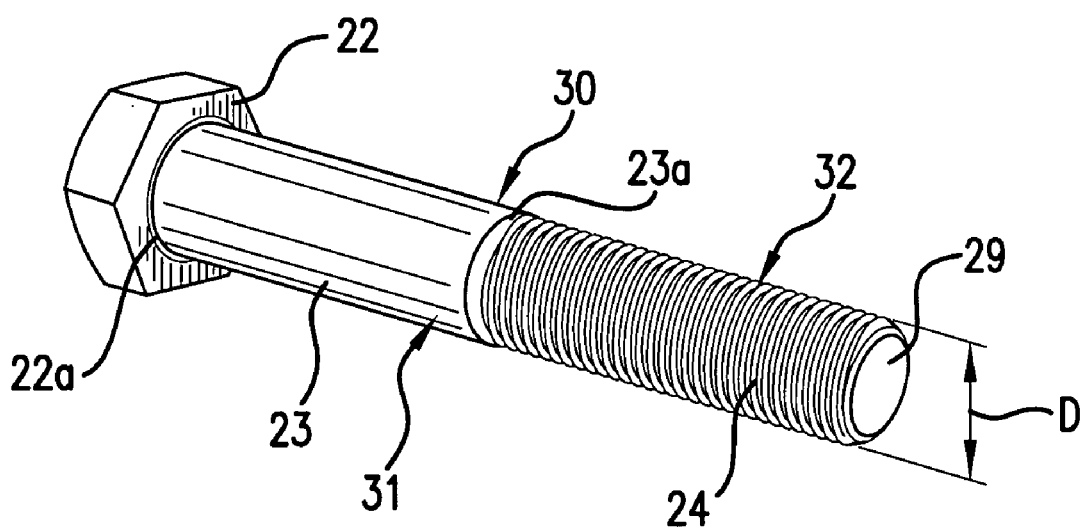
FIG. 4 is a perspective view of the bolt blank of FIG. 1 configured with a threaded portion to form a prior art fastener.

The bolt blank 20 is then formed into the threaded fastener 31 of FIG. 4 by being threaded in a thread rolling machine (not shown) to provide the second portion 24 of the rod 21 with a helical thread 32. The diameter of the helical thread 32 is usually slightly smaller than the nominal diameter D of the threaded fastener 31, which, for example, can be used as a threaded bolt or as a cap screw. Usually, the nominal diameter D is substantially equal to the diameter D of the unthreaded shank portion 23. The subject matter of FIGS. 1-5 is indicative of prior art approaches to the manufacturer of threaded fasteners wherein threaded fasteners are kicked out of cavity dies 25 in bolt making machines.

Figure 5:
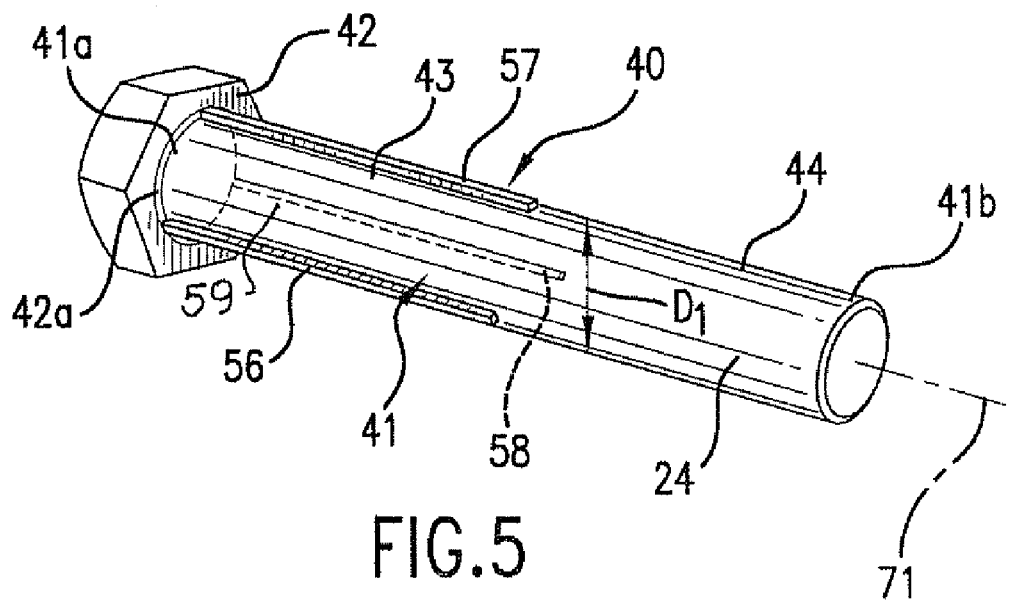
FIG. 5 is a perspective view of a bolt blank configured in accordance with the principles of the present invention for forming a fastener.

Referring now to FIG. 5 there is shown a bolt blank 40 configured in accordance with the principles of the present invention. Like the bolt blank 20 of the prior art, the bolt blank 40 is comprised of a rod 41 having a unitary bolt head 42 at a first end 41a to form a head end from which extends a first portion 43 that forms a shank portion. Preferably, there is a fillet 42a formed at the juncture between the bolt head 42 and the rod 41. A second portion 44 extends from the first portion 43 towards a second end 41b of the rod 41. The first portion 43 is a smooth shank portion and the second portion 44 is subsequently upset in a thread rolling machine to provide a thread 63 (see FIG. 8). The rod 41 of the blank 40 preferably has a constant diameter $D_1$ over its entire length, as compared to the blank 20 of FIG. 1, which has two diameters. However, the rod 41 may be stepped and may also have a slight taper, not to exceed one thread pitch, along the length of the shank portion 43 toward the second portion 44 of the rod. The shank portion 43 has arcuate sections 59 which are each open-ended and unobstructed with respect to the second portion 44 of the rod 41.

Figure 6:
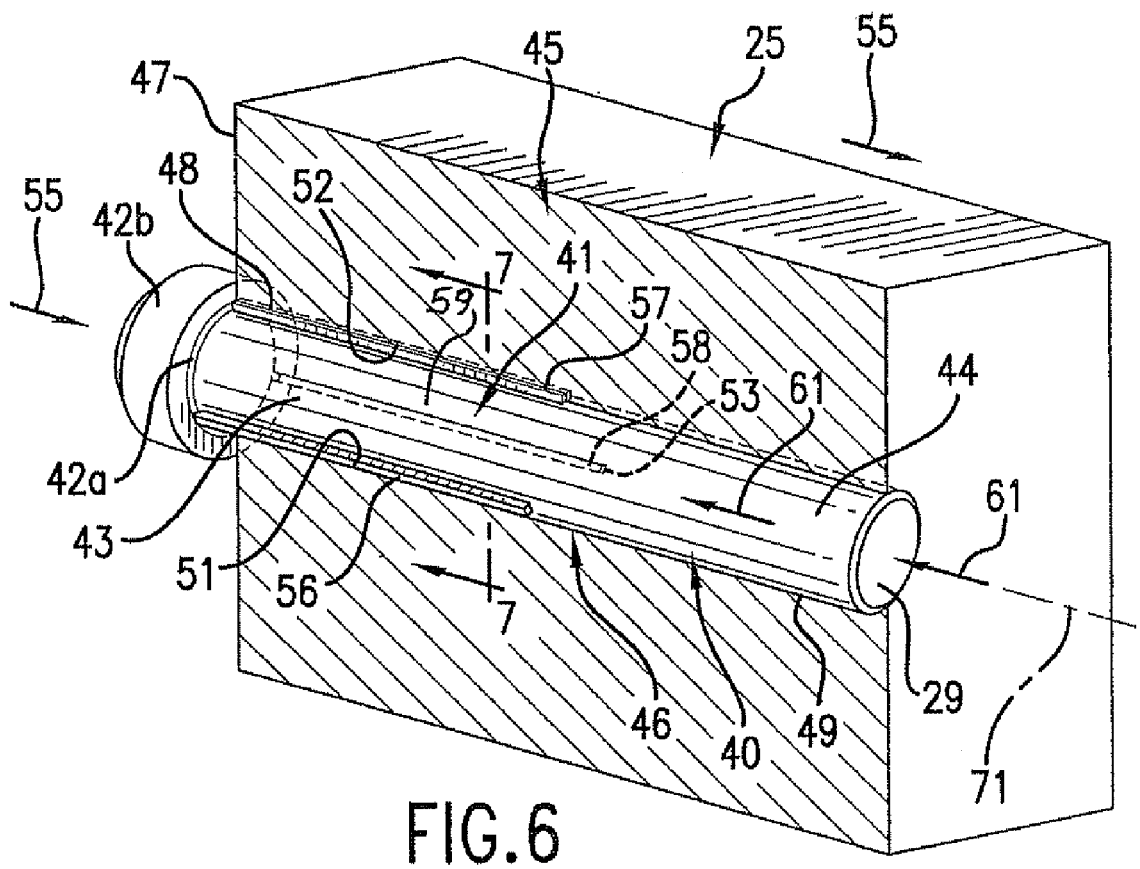
FIG. 6 is a perspective view of the bolt blank of FIG. 5 positioned in a die just prior to ejectment from the die.
Figure 7:
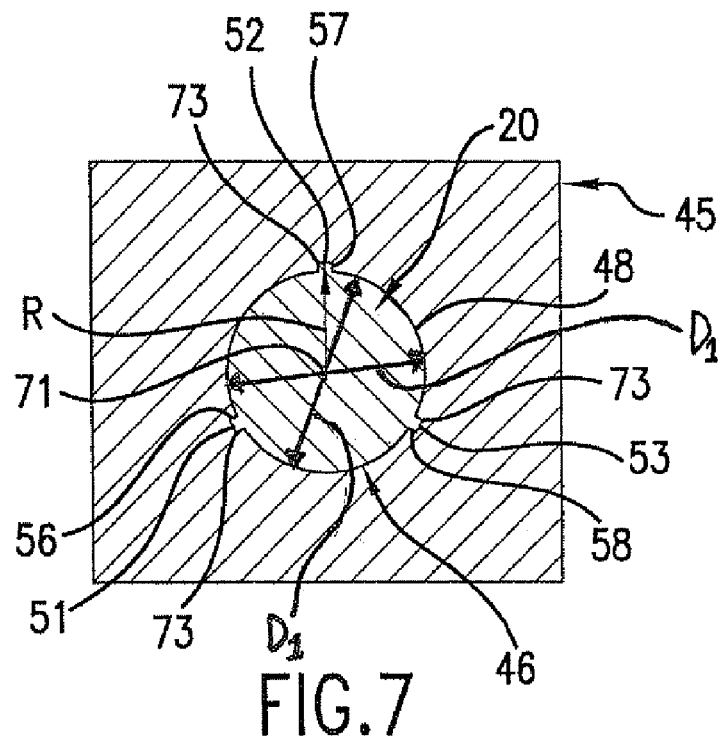
FIG. 7 is an elevation taken along lines 7-7 of FIG. 6.
Figure 9:
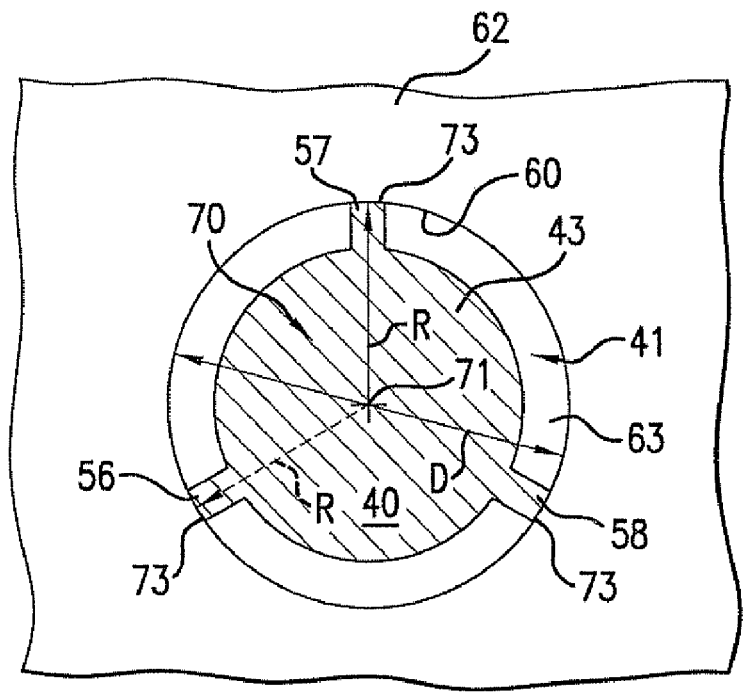
FIG. 9 is an elevational view of the threaded fastener of FIG. 8, slidably mounted in a bore of an element to be joined to an adjacent element, wherein the shank portion of the fastener has three longitudinally extending, straight ribs.
Figure 10:
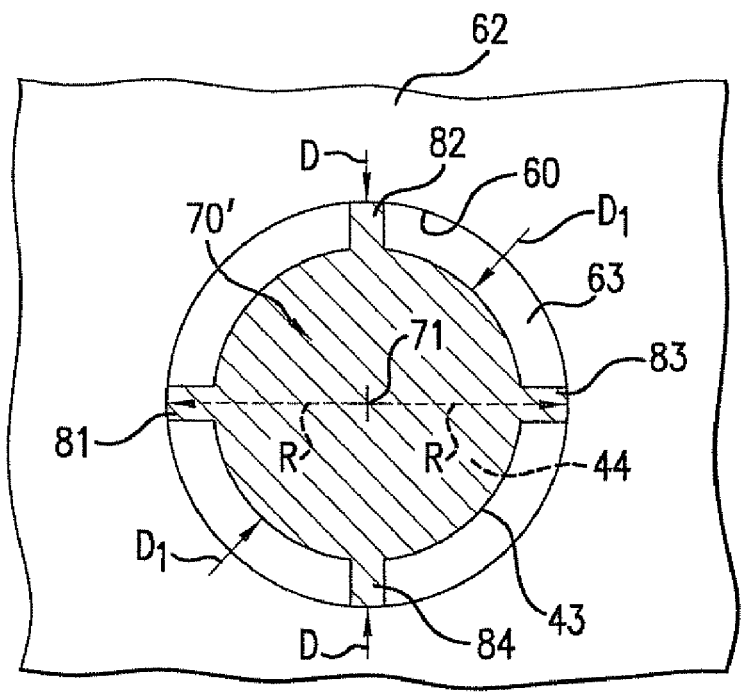
FIG. 10 is a view similar to FIG. 9, but showing a threaded fastener with four longitudinally extending, straight ribs.

As is seen in FIGS. 6 and 7, a modified configuration cavity die 45 is used to form the bolt blank 40. The modified configuration cavity die 45 of FIG. 7 has a cylindrical die face 46 of a diameter that is constant or tapered, rather than the stepped cylindrical die face 26 of FIG. 2. The die face 26 in one embodiment is frustoconical to form a tapered first portion 43. The cavity die 45 also has a front face 47 which abuts against the circular head 42b of the bolt blank 40 to be made subsequently into the hexagonal or rectangular bolt head 42 of FIG. 1. As is seen in FIGS. 6 and 7, the cylindrical die face 46 has a first portion 48 and a second portion 49. The first portion 48 has at least three grooves 51, 52 and 53 therein, while the second portion 49 preferably has a cylindrical die surface of a constant diameter. In a suggested embodiment, as the steel rod 41 is inserted through the die face 48, the grooves 51, 52 and 53 form three ribs 56, 57 and 58 on the rod 41. Other approaches to forming the ribs 56, 57 and 58 may be employed. The three ribs 56, 57 and 58 increase the cross-sectional area of the shank portion a few percent above the stress area of the fastener thread 63 (see FIG. 8). In the practice of the present invention, it is only necessary that the bolt blank be configured so that it can be ejected or kicked out of the die 45 without substantially altering operation of the bolt making machine. As is seen in FIGS. 9 and 10, the ribs 56, 57 and 58 form spacers which center the shank portion 43 within a bore 60 of an element 62 to be fastened. Between the ribs 56, 57 and 58 there are the arcuate sections 59 of the unthreaded shank portion 43 wherein the arcuate sections each have a diameter of $D_1$. The arcuate sections 59 are each open-ended and unobstructed with respect to the second portion 44 of the rod 41.

Once the bolt blank 40 is formed, the blank is axially ejected or kicked out of the bore 46 in the die 45. As is apparent from FIGS. 5-7, the blank 40 is not obstructed from passing out of the die 45 in the direction of the arrow 61 because the grooves 51, 52 and 53 are not axially obstructed by a transverse blocking wall. Moreover, the rod 41 is of a constant or slightly tapered diameter and thus can slide out of the cylindrical cavity die 45.

Figure 8:
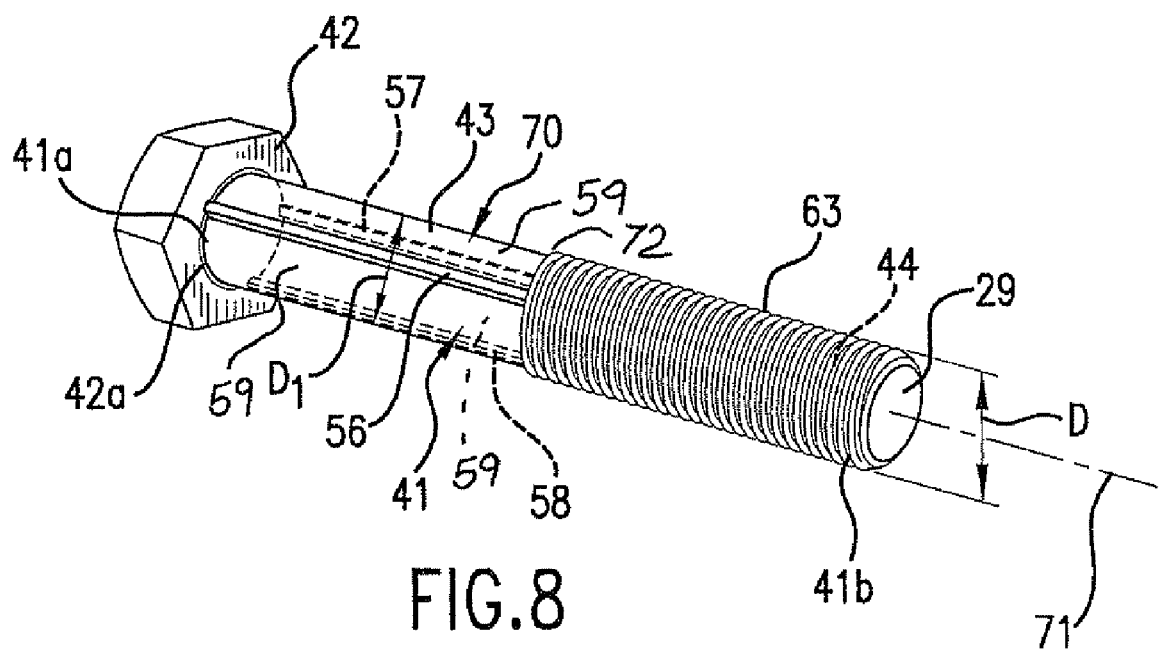
FIG. 8 is a perspective view of a threaded fastener made from the bolt blank of FIG. 6.

As is seen in FIG. 8, the blank 40 of FIG. 5 has been converted into a threaded fastener 70 in the form of a threaded bolt or cap screw by applying a thread rolling machine to the second portion 44 of the rod 41 to create a helical thread 63. As is evident from FIGS. 8, 9 and 10, the helical thread 63 gives the second portion 44 of the rod a diameter which is slightly less than the nominal diameter of the fastener 70 because the diameter D is substantially equal to two times the radius R from the axis 71 of the fastener 70 and blank 40 to the outer edge 73 of each of the ribs 51, 52 and 53 of FIG. 7. This allows the thread 49 to pass through the bore 60 of the element 62 when fastening the element 62 to another element by either screwing the fastener 70 into a threaded bore in an adjacent element (not shown) or retaining an adjacent element with a nut threaded onto the thread 63. The arcuate sections 59 are each open-ended and unobstructed at a radial area of intersection 72 with the helical thread 63.

As is seen in FIG. 9, the ribs 56, 57 and 58 center the threaded fastener 70 in the bore 60 allowing up to about 20% of the unthreaded shank portion 43 to be removed in the spaces between the ribs 56, 57 and 58. The reduced material reduces the cost of the fastener 70 as well as reducing the weight of the fasteners.

Figure 11:
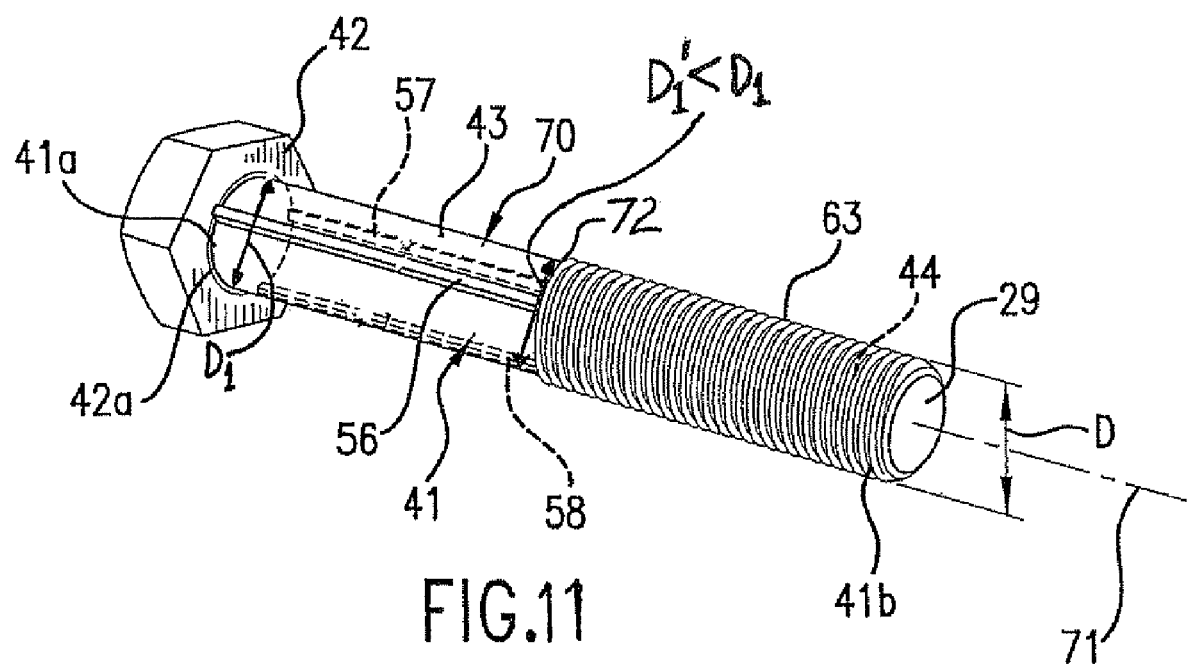
FIG. 11 is a view similar to FIG. 8 but showing a threaded fastener with a tapered unthreaded shank.

As is seen in FIG. 11, the unthreaded shank portion 43' is tapered from the head 42 to the threaded portion 63 by virtue of $D_1 < D_1$. This facilitates the blank 40 forming the threaded bolt or cap screw to be ejected or licked out of the die 45 of FIG. 6.

As is seen in the embodiment of FIG. 10, four longitudinally extending rubs 81-84 are used in a threaded fastener 70' made from a blank having four ribs so as to stabilize the fastener 70' in the element 62. While three or four sets of longitudinally extending ribs are shown in FIGS. 9 and 10 more ribs may be utilized to stabilize the shank in the bore 62 of the element 60. Three ribs 56, 57 and 58 are preferred.

Thus, bolts and cap screws 70 with shank portions 43 of reduced cross sectional area are provided using conventional automatic bolt making cold forming machines. No additional manufacturing steps or special equipment are required to produce the inventive bolts 70 with reduced cross section shanks. The present invention produces bolts and cap screws that pass mechanical testing requirements for bolts specified within SAE J429, ASTM A307, ASTM A354, ASTM A449, ASTM A574, ASTM F 788M, ASTM F 836M, ASTM 738M, ASTM F1852 and Mil Spec. MIL-S-7742 but may be made with about 20% less material for the shank portion. The torsional strengths of the inventive reduced section fastener shanks exceed the torsional strengths and rigidity of the threaded parts of those bolts. The present invention is applicable to the manufacturing of standard hexagonal headed fasteners as well as socket headed fasteners.

The reduced weight of the threaded fasteners 70 provide bolts that reduce the weight of vehicles with accompanying fuel savings. Improved engine operating energy efficiencies are derived when the threaded fasteners 70 are used to fasten together connecting rods compared to the use of conventional full diameter shank bolts. The threaded fasteners 70 provide bolts that display greater shank elongation for a given assembly torque while experiencing lower stress cycles during externally applied external loads cycles which improves fatigue life. The increased shank stretch improves joint clamping and is more resistant to loosening due to metal relaxation following assembly. In addition when employing fasteners 70 manufactured according to the present invention it is not necessary to chose the shortest possible fastener length to provide sufficient unengaged threads within the grip length of the joint to absorb external loads and shock loads. Shock loads are less harmful to joint integrity as the reduced cross section shank has a spring rate only slightly greater than the unengaged thread part of the fastener. The freedom from thread root notches in the reduced shank cross section portion 43 of the fastener provides fewer locations for fatigue failure initiation compared to fully threaded fasteners. The advantages of reduced shank cross section fasteners are especially notable for heat treated fasteners where the advantages derived from cold working the thread root areas of the fasteners are largely lost during treatment.

It is a feature of this invention to produce fasteners with reduced cross section shanks 43 with diameters $D_1$ near that of the minimum diameter required to form the thread stress area using automatic bolt making machines. Fasteners manufactured according to the present invention preferably have similar shank and thread stress area cross sectional areas. The shank area diameters of the inventive fasteners may however be made with somewhat larger than the diameters required to form the thread area. The straight ribs 56, 57 and 58 in the shank area of the threaded fastener 70 are formed along the length of the shank portion 43 from the fillet 42a under the fastener head 42 continuously to the part of the fastener 70 to be formed into the thread 63. For some applications, including connecting rod and main bearing bolts, the ribs 56, 57 and 58 may advantageously be shortened to about ¼ inch in length, which is less than the whole length of the shank portion 43 but of sufficient length to align the bolt head end within the bore 60. Fasteners manufactured according to the present invention do not have closed ended grooves or raised diameter areas along the length of the shanks or between the shanks and the thread sections when ejected from the bolt making machine.

In the present invention, improved metal; threaded bolts and cap screws are used for clamping joints rather than resisting shear forces and the process for manufacturing them. In particular, this invention pertains to externally threaded fasteners with reduced shank cross sections with longitudinal ribs to center the fasteners within cylindrical holes. The fasteners are intended to be installed by tightening their nuts or cap screw heads to stretch the fastener unengaged threads 63 and shank portions 43 elastically. The loads on the installed inventive fasteners 70 are typically less than the proof load to avoid plastically stretching the fasteners upon application of external loads that are partly carried by the fastener. By making the shank cross section diameter nearly the same as the unfinished thread part of the fastener and minimizing the cross section of the ribs 56, 57 and 58, the tensile stress in the shank portion 43 can be increased to nearly the same as within the unengaged thread part of the fastener between the engaged thread and the shank.

From the foregoing description, one skilled in the art can easily ascertain the essential characteristics of this invention, and without departing form the spirit and scope thereof, can make various changes and modifications of the invention to adapt it to various usages and conditions.

I claim:

1. A fastener configured to pass through a bolt hole in an item to be joined and thread into a threaded bore, the fastener being a bolt or cap screw having an unthreaded shank and formed from a blank by a die which forms mechanical features of the bolt shank, the blank being ejectable from a die upon applying an axial force to the blank, the fastener comprising:

a rod having a longitudinal axis, a first end and a second end;

a head at the first end of the rod for abutting a surface adjacent the bolt hole;

a threaded portion of the rod having a thread raised from the rod and extending axially from the second end of the rod toward the head, the threaded portion defining a nominal diameter D of the bolt and a thread stress area;

an unthreaded shank portion extending directly from a radial area of intersection of the unthreaded shank portion with the threaded portion to the head, the unthreaded shank portion having convex arcuate sections which are spaced by longitudinally extending ribs, the convex arcuate sections having a common axis of curvature and having diameters $D_1$, the diameters $D_1$ remaining substantially equal from the head to the threaded portion if the unthreaded shank portion is cylindrical or decreasing from the diameter $D_1$ at the head to a smaller diameter if the unthreaded shank portion diminishes in diameter, with the convex arcuate sections being open-ended and unobstructed at the radial area of intersection of the unthreaded shank portion with the threaded portion;

the convex arcuate sections being defined between at least three of the longitudinally extending ribs disposed on the unthreaded shank portion, the ribs each being and having a radius R greater than $D_1$ divided by two to laterally stabilize the bolt in the bolt hole, and whereby the unthreaded shank portion provides additional elastic stretch in the shank of the fastener upon application of external joint parting loads.

2. The fastener of claim 1 wherein the unthreaded shank portion has a cross sectional area that is greater than the thread stress area at a cross section taken through the longitudinally extending ribs.

3. The fastener of claim 1 wherein the fastener is made of steel or other metal.

4. The fastener of claim 1 wherein there are three longitudinal extending straight ribs.

5. The fastener of claim 1 wherein there are four longitudinal extending straight ribs.

6. The fastener of claim 1 wherein the unthreaded shank portion has a cross sectional area that is greater at a cross section taken through the longitudinally extending ribs.

7. The fastener of claim 1 wherein the thread is raised from the rod by rolling the rod.

8. The fastener of claim 7 wherein the die cold forms mechanical features of the bolt shank and wherein the longitudinally extending ribs are cold formed on the unthreaded shank portion.

9. The fastener of claim 1 wherein the die cold forms mechanical features of the bolt shank and wherein the longitudinally extending ribs are cold formed on the unthreaded shank portion.

* * * * *